June 28, 1966 M. KATZMAN 3,258,717
LASER CAVITY HAVING SPHERICAL REFLECTORS
Filed Aug. 3, 1962
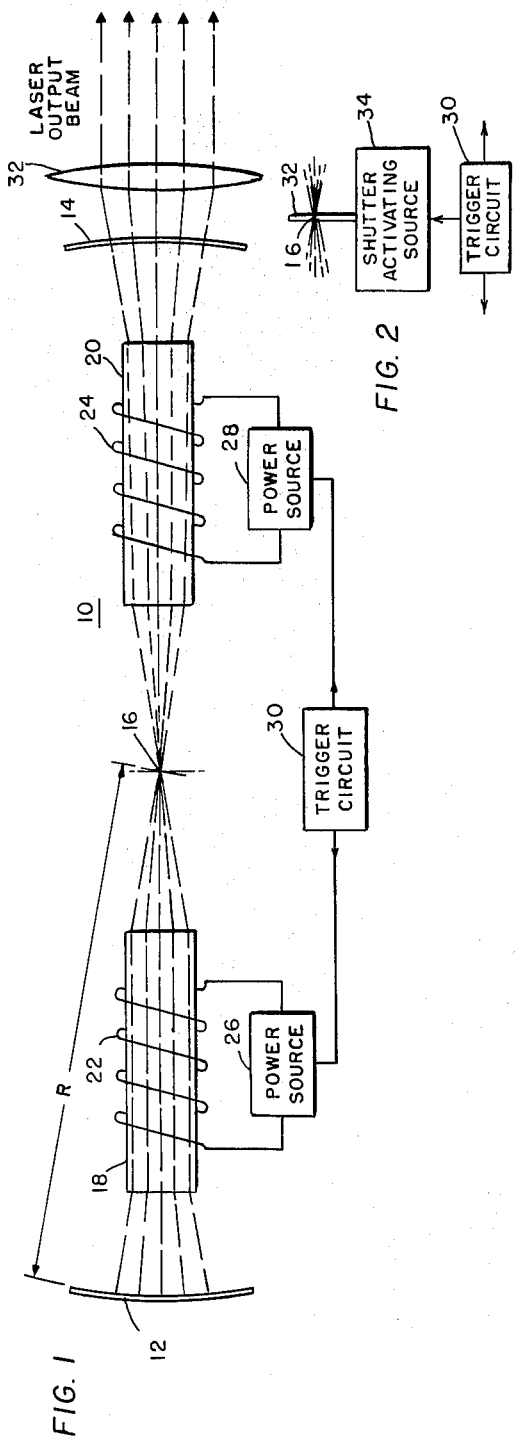
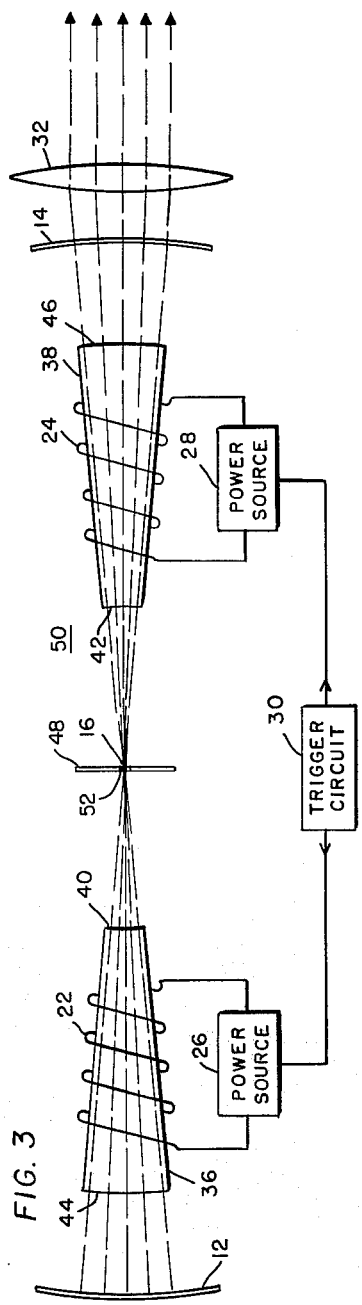
INVENTOR,
MORRIS KATZMAN
BY Harry M. Saragovitz
ATTORNEY.

United States Patent Office 3,258,717
Patented June 28, 1966

3,258,717
LASER CAVITY HAVING SPHERICAL
REFLECTORS
Morris Katzman, Elberon, N.J., assignor to the United States of America as represented by the Secretary of the Army
Filed Aug. 3, 1962, Ser. No. 214,770
9 Claims. (Cl. 331—94.5)

The invention described herein may be manufactured and used by or for the Government for governmental purposes without the payment of any royalty thereon.

This invention relates to light generators and more particularly to laser type light generators.

Laser stands for "light amplification by stimulated emission of radiation." Following the proposal to extend the maser principle to the optical spectral region some workers in the art have used the acronym "laser" instead of "optical maser." Generally speaking lasers or optical masers may be defined as devices for the generation or amplification of coherent and monochromatic light waves in the optical region of the electromagnetic spectrum. The general principles of lasers are described in a paper entitled "Optical Masers" appearing in volume 204, No. 6, of the Scientific American, June 1961, pages 52 through 61.

A conventional laser comprises a doped ruby rod with silvered ends acting as parallel reflectors. Such a laser will go into oscillation when sufficient population inversion has been attained by pumping with a high intensity light source. It has recently been proposed to utilize lasers in the fields of communications, range-finding, space vehicle guidance and special purpose illumination. However, the main difficulties with these prior lasers are that their use is unsuited for these applications because they yield insufficient power output, and they are characterized by a multiple number of modes of propagation in the frequency range of interest.

Accordingly, an object of the present invention is an efficient laser device which yields a higher energy output than previously attained.

Another object of this invention is to provide a practically realizable laser structure which is capable of the generation of monochromatic radiation or coherent amplification of usable energy and power levels and with a minimum of modes of oscillation.

A further object of the invention is to provide a system for producing a laser output beam having a burst of light energy of marked increased pulse height and marked decreased pulse width.

An illustrative embodiment of the invention comprises a laser generator including two spherical reflectors having opposing concave reflecting surfaces spaced along a common axis. The opposing concave surfaces have equal radii of curvature and a common center of curvature. A plurality of elongated spaced active laser media are axially aligned with and intermediate said concave reflecting surfaces. Also included are means operatively associated with said laser media whereby said laser generator will go into oscillation.

For a more detailed description of the invention together with other and further objects thereof, reference is had to the following description, taken in connection with the accompanying drawing, in which:

FIG. 1 is a schematic diagram of a laser illustrative of this invention;

FIG. 2 illustrates a shutter means which may be used with the laser illustrated in FIG 1; and FIG. 3 is a schematic diagram of a laser, depicting a modification of the invention, having conical shaped laser media, and also including a pinhole disc precisely positioned intermediate the opposing spherical reflectors.

Referring now to FIG. 1, there is shown a laser 10 in which the principles of the present invention are illustratively embodied. Laser 10 includes a resonant cavity, or resonator, formed by two axially aligned opposing concave reflectors 12 and 14. Reflectors 12 and 14 have identical radii of curvature and are equally spaced along a common axis from the common effective center of curvature 16 by the effective radius of curvature R. The effective center of curvature 16 is that point where all of the reflected rays which are reflected along a line normal to reflectors 12 and 14 will eventually converge. The effective radius of curvature in this case will be slightly longer than the geometrical radius of curvature for a reason which will later become obvious. Reflector 12 is opaque and of maximum reflectance, and output reflector 14 is partially reflective. Output reflector 14 is slightly transparent, as the output of the laser is obtained through the partially reflecting surface of this reflector. At least two spaced active laser media 18 and 20, in the form of elongated rods, are positioned intermediate reflectors 12 and 14, and are axially aligned therewith. The common axis of these rods is the line passing through the effective center of curvature 16. Media 18 and 20 are surrounded by electronic flash tubes 22 and 24, respectively, which provide broadband pumping light to each of the media. Flash tubes 22 and 24 are energized by discrete power sources 26 and 28, respectively. A trigger circuit 30 having its output coupled to the respective power sources 26 and 28 completes the laser 10. A double-convex lens 32 may be employed to reconvert the radiated energy transmitted through output reflector 14 to the form of a plane wave.

The active laser media 18 and 20, preferably ruby rods, may be either a gas or a crystal doped by certain atoms. The media must possess two atomic states separated in energy by an amount corresponding to the frequency desired, and it must be possible to over populate the upper of these states with respect to the lower. This is done by pumping the atoms from a ground state to a higher energy state either electrically or optically. Ruby, which is a crystalline aluminum oxide with chromium atoms substituted for some of the aluminum atoms, has a set of energy levels well suited for use in a laser, as most of the chromium atoms can be placed in an excited metastable state, so that an electromagnetic wave of the right frequency passing through them will stimulate a cascade of photons. Other examples of suitable laser media are those using samarium or uranium ions in a calcium fluoride crystal, and the recently announced glass laser which comprises a rod of barium crown glass doped with neodymium ions.

Ruby rods 18 and 20 may be of respective different lengths and thicknesses, and their end surfaces are made non-reflective by being polished optically flat and parallel, or by applying a coating thereon of magnesium fluoride. Because the end surfaces of rods 18 and 20 are parallel, the spherical waves reflected from reflectors 12 and 14 will be refracted at these surfaces, thereby causing the rays to converge at the effective center of curvature 16 which in practice will be only slightly displaced from the geometric center of curvature of the reflectors 12 and 14. Laser 10 is relatively easy to adjust in that no strict parallelism is required between the reflectors 12 and 14. In the operation of a device such as laser 10, the trigger circuit 30 can be set to supply either simultaneous or sequential energizing signals to power sources 26 and 28. Thus, flash tubes 22 and 24 can be initiated either simultaneously or alternately to generate oscillation in the laser.

One example of an embodiment like that of FIG. 1 is as follows: Spherical reflectors 12 and 14 are separated by a distance of 4 meters. Output reflector 14 has a reflectance of 50% and the rear reflector 12 of 98%. The uncooled rubies 18 and 20 are each 9.5 millimeters in diameter and 44 millimeters long, and are positioned in the resonant cavity at opposite sides of the center of curvature 16. A 4 joule output with a series of spikes of radiation, each having a 100 nanosecond duration at the base of the spike pulse, are produced when the rubies 18 and 20 are each simultaneously pumped with 3200 joules.

In another experiment, with a model of the invention having the same parameters illustrated above, flash tubes 22 and 24 are alternately pumped to modulate or chop the radiations. Ruby 18 is initially pumped, and the pumping of ruby 20 is delayed until ruby 18 attains a maximum population inversion. In other words, the staggered pumping of the rubies 18 and 20 acts similar to a shutter, and radiation in the resonant cavity is delayed until strong pumping of several times threshold is initiated in the initially pumped ruby 18. In this example, a peak pulse power of 3 megawatts for single pulse operation with the single spike having a 100 nanosecond duration at the base of the pulse was attained.

A radiation control shutter suitable for the generator disclosed in FIG. 1, is shown in FIG. 2. Shutter 32, which is positioned at the effective center of curvature 16 of laser 10 as shown in FIG. 1, may be any suitable means, such as a mechanical chopping-wheel or an electro-optical Kerr cell. Shutter 32 is inserted at point 16 to control the Q of the resonating laser and thereby control or modulate the laser oscillations. This occurs since all the radiations during oscillation of the laser must pass through point 16, which is the common effective center of curvature of the similarly curved reflectors 12 and 14. A shutter activating source 34 is connected intermediate shutter 32 and trigger circuit 30.

In the operation of the above device, shutter 32 is initially closed to prevent oscillation, and trigger circuit 30 is set to supply simultaneous signals to power sources 26 and 28 and initiate flash tubes 22 and 24, respectively, to pump rods 18 and 20. Since laser oscillation is prevented by the closed shutter 32 during most of the pumping cycle, the population difference between the upper and lower excitation states of laser rods 18 and 20 are increased over that normally required for oscillation. Shutter 32 is then opened by a signal from trigger circuit 30 at the precise time when rods 18 and 20 have attained a maximum population inversion, which is substantially over the threshold population difference required for laser action. The output energy is emitted in a single short duration burst of high peak power. A particular model like that of FIG. 2 produced a peak pulse power of 3.5 megawatts for single pulse operation of 100 nanosecond duration using 4000 joule input to each flash tube.

The laser generator 50 shown in FIG. 3 is similar to the generator 10 described in FIG. 1 and includes reflectors 12 and 14 which are sections of the same sphere, flash lamps 22 and 24, power sources 26 and 28, trigger circuit 30 and lens 32.

Positioned, respectively, within helical flash lamps 22 and 24, are laser media 36 and 38 axially aligned with reflectors 12 and 14. Media 36 and 37 are frusto-conical in shape with parallel end surfaces having their respective narrow end surfaces 40 and 42 directed toward the center of curvature 16, and their respective base surfaces 44 and 46 toward respective reflectors 12 and 14. The respective narrow end surfaces 40 and 44 may be curved and be sections of the same sphere, as may the respective base surfaces 44 and 46 but with a different radius of curvature, and thus be concentric with point 16 as their common center of curvature. In this case, however, because there will be no refraction at end surfaces 40, 42, 44, and 46, the effective center of curvature of the system will be coincident with the geometric center of curvature and will be located at point 16. Media 36 and 38 are utilized in the same fashion as are rods 18 and 20 in laser 10, since all the radiant energy during oscillation passes through point 16. Base surface 44 of laser medium 36 may have maximum reflectance, and base surface 46 of medium 38 may be slightly transparent so that reflectors 12 and 14 may be obviated. Also, several such spaced arrays as media 36 and 38 may be positioned within the resonant cavity. The advantage of the frusto-conical shaped media 36 and 38 is that the volume of laser media contains no absorbing regions near their side surfaces, and that the focus at the center of curvature 16 is made sharper due to the absence of refraction at the end surfaces of the media.

As shown in FIG. 3, the radiations of laser generator 50 during oscillation is cone-shaped, with all radiations passing through point 16 and within the side surfaces of the frusto-conical media 36 and 38. With this in mind, mode selection in laser 50 is readily controlled, since all modes must pass through point 16. Thus by axially positioning within laser 50 an opaque disc 48 having a pinhole 52 coincident with point 16, the large background of non-longitudinal modes will be effectively isolated, and only longitudinal modes will be supported in the laser.

Although the examples described utilize ruby crystals, it is to be understood that the principles of the invention are applicable to any active medium in which the desired separation of energy levels are realized. In addition, each of the ruby crystals can be operated at different temperatures so as to narrow the spectral line and provide improved low-noise monochromatic output.

While there has been described what is at present considered to be the preferred embodiments of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. A lasser generator comprising two spherical reflectors having opposing concave reflecting surfaces spaced along a common axis, at least one of said surfaces being partially transparent said opposing concave surfaces having equal radii of curvature and a common effective center of curvature, a plurality of elongated spaced active laser media disposed intermediate said concave surfaces with the longitudinal axes of said laser media passing through said common center of curvature and being coincident with said common axis, and pumping means operatively associated with said active laser media whereby said laser generator will go into oscillation.

2. A laser generator as in claim 1 wherein said spaced active laser media are positioned on opposite sides of said center of curvature.

3. A laser generator as in claim 1 wherein said spaced active laser media are in the form of rods having non-reflecting end surfaces.

4. A laser generator as in claim 1 wherein said spaced active laser media are frusto-conical in shape, and are positioned in axial alignment with said concave reflecting surfaces on opposite sides of said center of curvature with their respective narrow end surfaces positioned toward said center of curvature.

5. A laser generator comprising two spherical reflectors having opposing concave reflecting surfaces spaced along a common axis, at least one of said surfaces being partially transparent, said opposing concave surfaces having equal radii of curvature and a common effective center of curvature, a plurality of elongated spaced active laser media axially aligned along an axis which passes normally through said spherical reflectors and through said common center of curvature and disposed intermediate said concave reflecting surfaces, pumping means arranged about each of said active media, a shutter means disposed at said center curvature, and means for synchronizing said pumping means and said shutter means whereby said shutter is open at the instant when said media has attained a maximum population inversion.

6. A laser generator as in claim 5 wherein said spaced active laser media are formed in the shape of rods with non-reflecting end surfaces.

7. A laser generator as in claim 5 wherein said spaced active laser media are frusto-conical in shape, and are positioned in axial alignment with said concave reflecting surfaces on opposite sides of said center of curvature with respective narrow end surfaces in the direction of said center curvature.

8. A laser generator comprising two spherical reflectors having opposing concave reflecting surfaces spaced along a common axis, at least one of said surfaces being partially transparent said opposing concave surfaces having equal radii of curvature and a common effective center of curvature, a pair of rod-shaped active laser media intermediate said concave reflecting surfaces, each of said rods positioned in axial alignment on opposite sides of said center of curvature and along an axis which passes normally through said spherical reflectors and through said common center of curvature, pumping means arranged about each of said rods, and means for successively initiating said pumping means whereby the second of said rods is pumped at the instant when said first rode has attained a maximum population inversion.

9. A laser generator comprising two spherical reflectors having opposing concave reflecting surfaces spaced along a common axis, said opposing concave surfaces having equal radii of curvature and a common center of curvature, at least one of said surfaces being partially transparent a plurality of rod-shaped active laser media intermediate said concave reflectors, said rods being positioned in axial alignment with said concave reflecting surfaces along an axis which passes normally through said spherical reflectors and through said common center of curvature, means operatively associated with said rods whereby said laser generator will go into oscillation, an opaque disc positioned normal to said axes at said center of curvature, said disc having a pinhole coincident with said center of curvature whereby non-longitudinal modes will be effectively isolated in said laser.

References Cited by the Examiner

UNITED STATES PATENTS 2,929,922   3/1960   Schawlow et al. _____ 88—1
3,055,257   9/1962   Boyd et al. _____ 88—1

OTHER REFERENCES

Newsletter, "Laser Output Amplified by Operation in Tandem," Electronics, vol. 35, No. 21, May 25, 1962, page 7.

Collins et al.: "Control of Population Inversion in Pulsed Optical Masers by Feedback Modulation," Journal of Applied Physics, vol. 33, No. 6, June 1962, pages 2009–2011.

JEWELL H. PEDERSEN, *Primary Examiner.*

R. L. WIBERT, *Assistant Examiner.*